June 21, 1955 — G. L. FANNIN — 2,710,977

CAR TOP SLEEPING COMPARTMENT

Filed Nov. 20, 1952

INVENTOR.
GRADY L. FANNIN
BY William Frederick Werner
ATTORNEY

June 21, 1955  G. L. FANNIN  2,710,977
CAR TOP SLEEPING COMPARTMENT
Filed Nov. 20, 1952  3 Sheets-Sheet 2

INVENTOR.
GRADY L. FANNIN
BY
William Frederick Werner
ATTORNEY

June 21, 1955     G. L. FANNIN     2,710,977
CAR TOP SLEEPING COMPARTMENT

Filed Nov. 20, 1952     3 Sheets-Sheet 3

INVENTOR.
GRADY L. FANNIN
BY
*William Frederick Werner*
ATTORNEY

United States Patent Office 2,710,977
Patented June 21, 1955

2,710,977
CAR TOP SLEEPING COMPARTMENT

Grady L. Fannin, Pawtucket, R. I.

Application November 20, 1952, Serial No. 321,587

5 Claims. (Cl. 5—119)

The present invention relates to improvements in car top sleeping compartments and more particularly to provide an enclosed structure for mounting upon the top of an automobile or other vehicle, affording facilities for occupancy and sleeping while on camping and automobile trips.

One object of the present invention is to provide an improved structure of sleeping compartment in which the device is demountably attached to the top of an automobile or other vehicle by means of a rack or undercarriage which has adjustable features in accommodating the device to various contours encountered in the roofs of various makes of automobiles, and in which provision is made on the sleeping structure for receiving the same upon the rack or undercarriage in a novel manner for efficient and sturdy support thereon and for quick and easy mounting and demounting.

The invention has for a further object to provide an improved sleeping compartment structure in which the entire structure is designed for removal from the top of the automobile with provision for its support at an elevation above the ground where it may be utilized for sleeping or for occupancy apart from the vehicle itself.

And still another object of the invention is to provide for a foldable structure which during movement of the car may be collapsed into relatively small compass affording a minimum of wind resistance and momentum disturbance while being fully protected from the elements and inclemencies of the weather.

With these and other objects in view, this invention consists in certain novel features of construction, combination and arrangement of parts to be hereinafter more fully described and claimed.

Past devices do not measure up to spaciousness, convenience, comfort, types of protection, compactness and durability of the present invention. United States Patents #2,530,450 and 2,222,636 may be taken as representative of the prior art wherein a canvas house is mounted on a car top. The disadvantages become obvious when compared to the drawings of the present invention where a sturdy structure of plywood or aluminum houses screens and weather curtains in addition to expansible wing compartments. One of the unique features of the present invention is the manner of folding a large rigid structure into a compact unit.

Referring to the drawings in which similar characters of reference indicate corresponding parts in all the figures.

Figure 8:
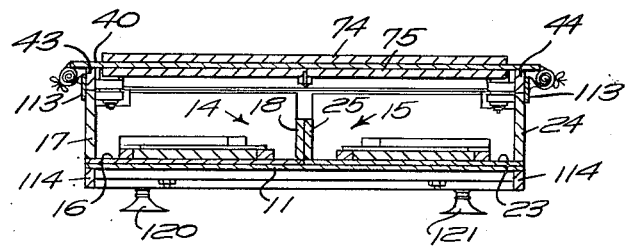
Figure 8 is a transverse sectional view, taken along line 8—8 of Figure 1, showing the relation of the several parts when in folded condition.

Referring more particularly to the drawings, 11 designates the bottom of the compartment structure, 12 and 13 upstanding front and rear walls. Two wing compartments, generally indicated at 14 and 15 are provided, each assuming a box-like base construction of sufficient depth to retain the pneumatic or other mattress, pillows, bedding and the like and to assist in preventing the occupants from accidentally rolling out of the compartments. They are constructed as follows. Wing compartment 14 constitutes a base 16, side rails 17, 18 and front rail 20 and rear rail 21. Wing compartment 15 constitutes a base 23, side rails 24, 25 and a front rail 26 and a rear rail 27. The bases 16 and 23 are supported, when the device is in folded condition, by base 11, see Figure 8. When wing compartments 14 and 15 are extended, the inboard ends of bases 16 and 23 are supported by base 11. The outboard ends of bases 16 and 23 are supported by detachably mounted and length adjusting stanchions 30, 31, 32 and 33 which have one end resting on the ground and the other end accommodated in sockets 9 located in bases 16 and 23. At this point in the description, it will be observed from Figures 2 and 3 that sleeping accommodations are provided for four persons, one in each wing compartment 14, 15 and two in the center section delineated by front wall 12, rear wall 13, side rail 18 and side rail 25.

Figure 1:
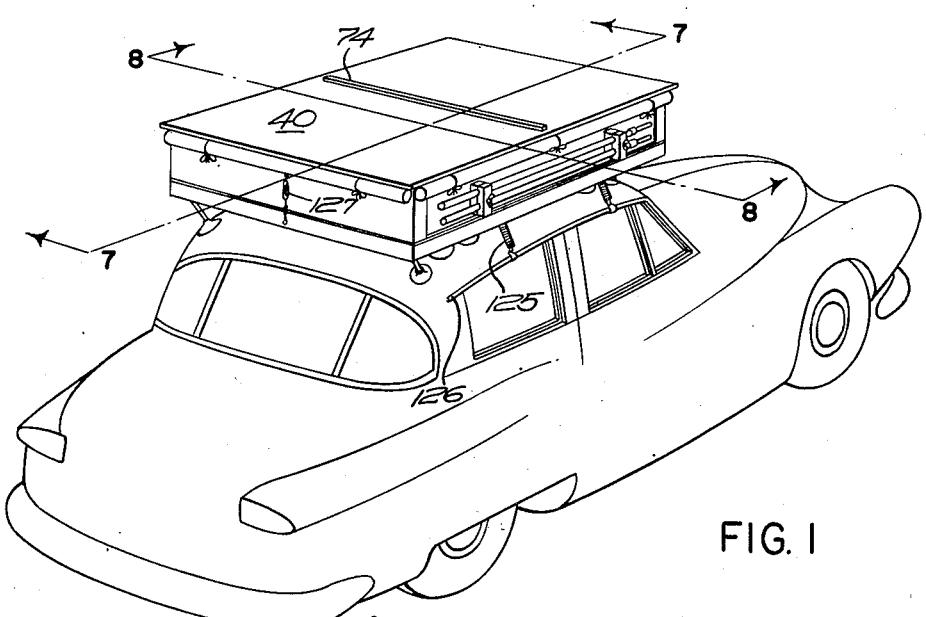
Figure 1 is a perspective view of an automobile shown equipped with a car top sleeping compartment in accordance with the present invention and shown in the collapsed position for running.

Stanchions 30, 31 and 32, 33 when the device is in folded condition are supported in pairs of chock blocks, see Figure 1, which comprise base blocks 34, 35 fastened to side rails 17 and 24, respectively. Companion face blocks 36, 37 are adjustably secured to base blocks 34, 35 by means of wing nuts 38, 39 mounted on studs secured in base blocks 34, 35. Face block 36 and base block 34 each have an upper and lower half round section which forms a fixture to grip stanchions 30, 31. Similarly, stanchions 32, 33 are gripped by base block 35 and face block 37.

A roof is provided consisting of a sheet of plywood, aluminum sheeting or the like, 40 having transverse, front strip 41 and rear strip 42 in alignment with front and rear walls 12, 13 respectively.

Also provided as companion pieces are left longitudinal strip 43 and right longitudinal strip 44 in alignment with side rails 17 and 24, respectively, when in closed position.

Hinge block 45 is fastened to front strip 41. Hinge block 46 is fastened to rear strip 42. Hinge block 47 is fastened to front wall 12 and hinge block 48 is fastened to rear wall 13. There are four supports located approximately at the corners of roof 40 and constructed as follows. The left rear support consists of two sections 50, 51 connected by a hinge 52. A hinge 53 connects section 50 with hinge block 46. A hinge 54 connects section 51 with hinge block 48. Similarly the right rear support consists of two sections 55, 56 connected by a hinge 57. Hinges connect sections 55, 56 to hinge blocks as in the left rear support. Similarly, the front left support consists of two sections 60, 61 connected by a hinge 62. A hinge 63 connects section 60 to hinge block 41. A hinge 64 connects section 61 to hinge block 47.

Similarly, the front right support consists of two sections 65, 66 connected by a hinge and connected to hinge blocks by means of hinges. Supports 50, 55, 60 and 65 are each provided with a spacer secured thereto. Support 50 has spacer 67 and support 60 has spacer 68, support 65 has spacer 69, the spacers merely providing compactness when the device is folded to prevent rattling of the several parts.

Figure 5:
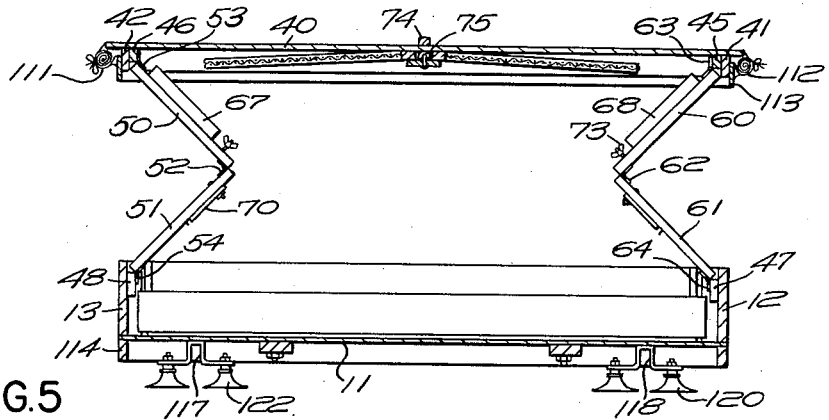
Figure 5 is a longitudinal sectional view taken along line 5—5 of Figure 2 and similar to Figure 4, but showing the structure about to be folded.
Figure 7:
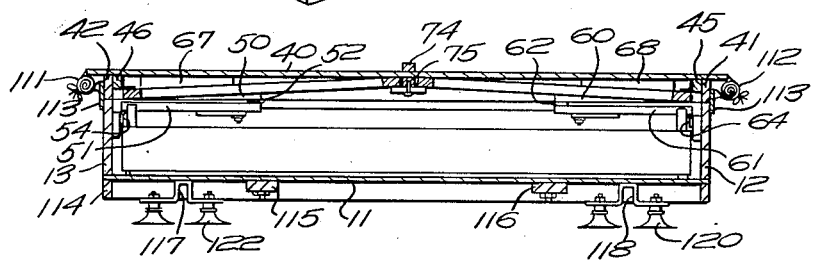
Figure 7 is a longitudinal sectional view, taken along line 7—7 of Figure 1, showing the relation of the several parts when in folded condition.

Each support is provided with a pivotally mounted latch consisting of a latch bar 70, pivotally mounted at 72 to the lower section as 61 and engageable with a wing nut 73 mounted in the upper section as 60. See Figure 3. The latch, when latch bar 70 is positioned to oppose the hinge behind it, gives rigidity to its support, holding roof 40 in extended or use position. When latch bar 70 is pivoted to the position shown in Figure 5, the hinges permit the supports to fold one upon the other, see Figure 7. Stiffening bars 74 and 75 may be provided to reinforce roof 40.

The partition 76 for wing compartment 14 consists of a side member comprising an upper strip 77, a lower strip 78, a front strip 80 and a rear strip 82 having a reinforcing strip 83 connecting the upper strip 77 and lower strip 78. A sheet of screening 84 is secured to the strip members.

The partition 76 is also provided with a front wing having an upper strip 85, a lower strip 86, a left hand strip 87 and a right hand strip 88. A sheet of screening 92 is secured to the strip members. A pair of hinges 90, 91 pivotally connect left hand strip 87 to front strip 80. A triangular member consisting of a base strip 93, an upright 94 and an angular side 95 and having either a screen secured thereto or a piece of plywood or sheet of aluminum, as shown, is pivotally mounted by means of hinges to upper strip 85 and base strip 93. A blind 96 is pivotally mounted by means of hinges to upper strip 85.

A rear wing 97 is identical in construction and forms part of partition 76. A partition 98 is identical in construction with partition 76. A hook 100 is secured in right hand strip 88 and unites with an eye 101 fixed in section 61. Another hook 102 is fixed in upright 94 and unites with eye 103 fixed in section 60. A pin 104 is fixed in the base of lower strip 78 and sets into socket 105 in side rail 17, thus aligning lower strip 78 with side rail 17 and preventing a shifting between the frame and rail while providing a quick and easy assembly.

Front rails 20, 26 and rear rails 21, 27 are provided with cut outs 106, 107, 108 and 109 which are of a size slightly wider and deeper than the width and depth of sections 61, 66, 51, 56 respectively. Said sections lie in said cut outs when the device is in folded condition. To prevent mosquitoes and the like from using said cut outs as an entry, lower frame 86 is provided with a projection 110 which fits in said cut outs. A roll of canvas 111 and 112 or the like is secured on one end to left longitudinal strip 43 and right longitudinal strip 44. In place of canvas 111 and 112 a piece of plywood or an aluminum sheet may be hinged to said strips 43 and 44 so that they extend across angular side 95 as does canvas 111, 112 and then pivot to lie flat against the underside of roof 40 when in folded condition. A bead of material 113 may be secured to longitudinal strips 43, 44, and front and rear strips 41, 42 to provide weather proof protection when the device is in folded position. See Figures 7 and 8. Similarly a bead 114 is secured to the outside edges of bottom 11. Two reinforcing strips 115 and 116 are secured to bottom 11. Two U-shaped wing brackets 117 and 118 are also secured to bottom 11, and are provided with two pairs of suction cups each, 120, 121 and 122, 123, which engage the top of the car. Pairs of straps 124 and 125 are secured to bead 114 and grip the rain gutter 126 of the car, thus securing the device to the car top. Toggles 127 have one end fixed to bead 113 and the other end fixed to bead 114. Any other type of catch could be used to hold the device in closed position.

Figure 2:
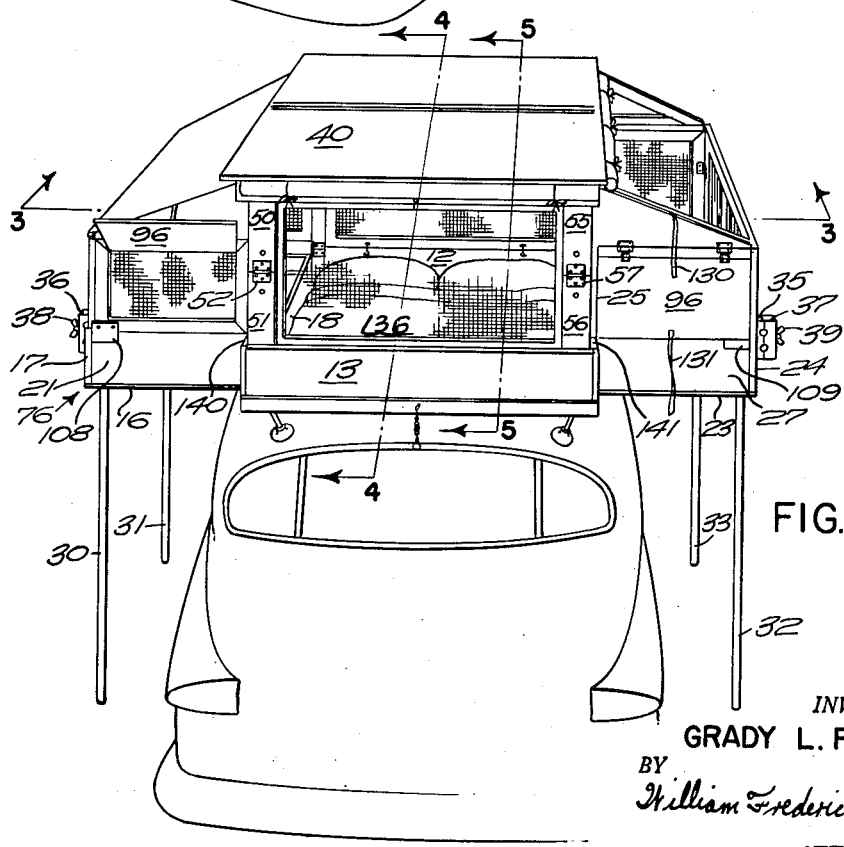
Figure 2 is a similar view showing the compartment extended and in condition for use.
Figure 3:
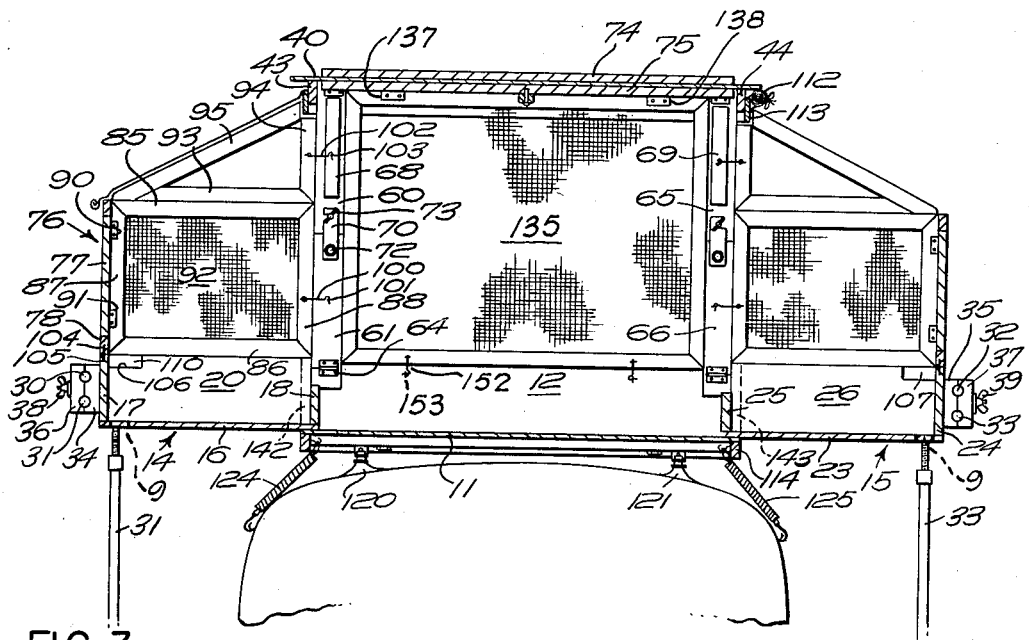
Figure 3 is a transverse sectional view taken along line 3—3 of Figure 2.

Upstanding front and rear walls 12 and 13 are provided with short side pieces 140, 141, 142, 143, see Figures 2 and 3, which prevent side rails 18 and 25 from being extended beyond side pieces 140, 142 and 141, 143, respectively.

In operation, the box-like structure shown in Figure 1 will be lifted atop a car with suction cups 120, 121, 122 and 123 gripping the car roof and flexing to the shape of the car roof. Straps 124 and 125 will be secured to the rain gutters or other beading on the car body. The car may be driven to a camp site where stanchions 30, 31, 32 and 33 will be removed from chock blocks by loosening wing nuts 38 and 39. Toggles 127 will be undone. Roof 40 will be raised causing sections 50, 51; 60, 61; 55, 56; 65, 66 to pivot around their respective hinges as for example hinges 53, 52, 54, see Figure 5, for sections 50, 51 and be extended so that latch bar 70, see Figure 3, may pivot around point 72 and be held in position by wing nut 73. Similarly, the other sections will be secured in extended position.

Wing compartments 14, 15 will then be withdrawn until side rails 18, 25 abut side pieces 140, 142 and 141, 143, respectively. Stanchions 30, 31, 32 and 33 will then be placed in position, as shown in Figure 2, and engage the sockets 9 in bases 16 and 23.

Figure 4:
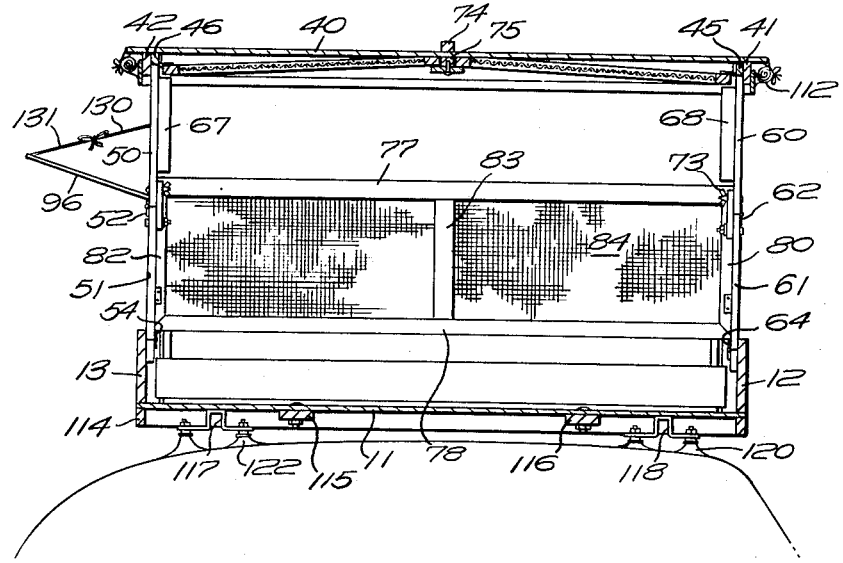
Figure 4 is a longitudinal sectional view taken along line 4—4 of Figure 2.
Figure 6:
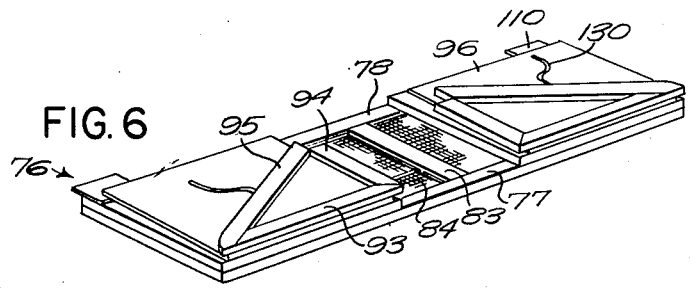
Figure 6 is a perspective view showing one of the wing sections folded.

Next the partition 76 for wing compartment 14, see Figure 6, will be unfolded and extended and then placed in position, see Figure 2, with pin 104 engaging socket 105 and lower strip 78 resting on side rail 17. Lower strip 86 will rest on front rail 20 and rear wing 97 will be similarly positioned over rear rail 21. Base strip 93 will be pivoted around its hinges so that it will take the position shown in Figure 3. Hook 100 will engage eye 101 and hook 102 will engage eye 103. Similarly rear wing 97 will be hooked into position. Canvas 111 will be untied and positioned over angular side 95 and its corresponding side in rear wing 97. Canvas 111 will be fastened in position as by hook secured in upper strip 77 and eyes fixed in the end of the canvas 111. In like manner wing 15 will be arranged and set in place. Blinds 96 will be adjusted in position as in wing 14 or as in wing 15 shown in Figure 2 by means of straps 130, 131 secured on one end to angular side 95 and blind 96, respectively, with the loose end tied together as in Figure 4.

In this manner, a comfortable spacious sleeping compartment is provided, screened in and affording protection against wind or rain when blinds are employed or canvas 111, 112 is allowed to project across partition 76 to base 16 or base 23.

Two screens 135, 136 the width of the distance between centers of supports 60, 61 and 65, 66 and 50, 51 and 55, 56 and the length of the distance from roof 40 to front and rear walls 12 and 13 are secured on one end to roof 40 by means of hinges 137, 138 and corresponding hinges (not shown) and on the other end to front wall 12 and rear wall 13, respectively, by means of hooks 152 and eyes 153. A duplicate set of eyes secured in stiffening bar 75 permits the screens 135, 136 to be swung into a substantially parallel position with roof 40 when the screens 135, 136 are not in use or when the device is in folded condition.

In folding the device, the steps of opening are exactly reversed.

Having shown and described a preferred embodiment of the present invention, by way of example, it should be realized that structural changes could be made and other examples given without departing from either the spirit or scope of this invention.

What I claim is:

1. For use with a car top, a demountable sleeping compartment comprising a bottom, means for anchoring the bottom in a fixed position on the car top, front and rear walls integral with said bottom, a wing compartment comprising a box having a base, side rails, front and rear rails, the base being supported in part by said bottom, a pair of stanchions, sockets in said base adapted to accommodate said pair of stanchions, side pieces integral with said front and rear wall adapted to abut said side rails, a second wing compartment identical with said first wing compartment, a roof having transverse front and rear strips in alignment with said front and rear walls, and left and right longitudinal strips in alignment with said side rails, hinge blocks fastened to said front and rear strips and to said front and rear walls, four supports consisting of two sections each pivotally mounted together and pivotally mounted to said hinge blocks, a latch pivotally mounted to one each of each pairs of sections and locked in position on the adjacent section, said latch opposing the pivoted connection uniting said sections, a partition for each wing compartment consisting of a side member, a front wing member pivotally mounted to said side member, a triangular member pivotally mounted to said front wing member, a rear wing member pivotally mounted to said side member, a second triangular member pivotally mounted to said rear wing member, covers pivotally mounted to said left and right longitudinal strips adapted to engage said triangular members and said side members, and means for securing said side member to one of said side rails and means for securing said front wing member to said front rail and means for securing said rear wing member to said rear rail and means for securing said triangular members to said supports.

2. For use with a car top, a demountable sleeping compartment comprising a bottom, means for anchoring the bottom in a fixed position on the car top, front and rear walls integral with said bottom, side pieces integral with said bottom and said front and rear walls, a wing compartment comprising a box having a base, side rails, front and rear rails integral with said base, the base being wholly supported by said bottom in one position and only supported in part by said bottom in another position, said other position being defined by the abutment of one of said side rails with said side pieces, a set of stanchions, sockets in said base adapted to accommodate said set of stanchions which support said base from the ground, a second wing compartment constructed and operating as said wing compartment, a roof having transverse front and rear strips and left and right longitudinal strips, four supports each consisting of two sections, each two sections pivotally mounted together and pivotally mounted to said front and rear strips, and to said front and rear walls, a latch pivotally mounted to one section of each of said four supports, and locked in position on the adjacent section, said latch opposing the pivoted connection uniting said sections, a partition for each wing compartment consisting of a side member provided with screening, a front wing member pivotally mounted to said side member and provided with screening, a triangular member pivotally mounted to said front wing member, a rear wing member pivotally mounted to said side member and provided with screening, a second triangular member pivotally mounted to said rear wing member, covers pivotally mounted to said left and right longitudinal strips adapted to rest on said triangular members and said side members and means for demountably securing said side members to said sections and means for demountably securing said triangular members to said sections.

3. For use with a car top, a demountable sleeping compartment comprising a bottom, means for anchoring the bottom in a fixed position on the car top, front and rear walls attached to said bottom, side pieces for use as stops attached to said bottom and to said front and rear walls, a first wing compartment comprising a box having a base, two side rails, front and rear rails attached to said side rails and said base, the base being wholly supported by said bottom in one position and only supported in part by said bottom in another position, said other position being defined by said stops, a set of chock blocks secured to said side rails, a set of stanchions demountably secured in said chock blocks, a set of sockets in said base adapted to accommodate said set of stanchions, a second wing compartment constructed as said first wing compartment, a roof having transverse front and rear strips and left and right longitudinal strips, hinge blocks fastened to said front and rear strips and to said front and rear walls, four supports each consisting of two sections, each two sections pivotally mounted together and pivotally mounted to said hinge blocks by means of hinges, a latch pivotally mounted to one of each pair of said sections and locked in position by means of a wing nut secured in the adjacent section, said latch opposing the hinge uniting the sections, a partition for each wing compartment consisting of a side member, a front wing member pivotally mounted to said side member by means of hinges, a triangular member pivotally mounted to said side member, by means of hinges, a rear wing member pivotally mounted to said side member by means of hinges, a second triangular member pivotally mounted to said rear wing member by means of hinges, canvas secured on one end to said left and to said right longitudinal strips and held in position over said triangular members and said side members, means including a pin and socket for securing said side member to one of said side rails and means including a hook and eye for securing said triangular members to said supports and cut outs in said front and rear rails to accommodate said sections of said supports when the device is in closed position and projections on said front and rear wing members to engage said cut outs when the device is in open position and blinds pivotally mounted to said front and rear wing members by means of hinges and tie strings secured to said blinds and to said front and rear wing members to position said blinds in position in front of said front and said rear wing members.

4. A demountable sleeping compartment comprising a bottom, means for anchoring the bottom in a fixed position, front and rear walls, secured to said bottom, side pieces secured to said bottom and to said front and rear walls, a wing compartment comprising a box having a base, side rails, front and rear rails, cut outs in said front and rear rails, said wing compartment being slidably mounted on said bottom and between said front and rear walls and said side pieces, said side rails engaging said side pieces, chock blocks secured to said side rails, a pair of stanchions, said stanchions being secured in said chock blocks when not in use, sockets in said base adapted to accommodate said pair of stanchions when said stanchions are in operative position, a second wing compartment constructed and functioning as said wing compartment, a roof having transverse front and rear strips positioned to rest on said front and rear walls and left and right longitudinal strips positioned to rest on said side rails, in one position of the device, hinge blocks fastened to said front and rear strips and to said front and rear walls, four supports consisting of two sections, each two sections pivotally mounted together and pivotally mounted to said hinge blocks by means of hinges, said sections resting one against the other in one position of the device and in said cut outs, a latch pivotally mounted on one of said sections and adapted to be locked in position on the adjacent section, in one position of the device, a partition for each wing compartment consisting of a side member, a front wing member hinged to said side member and positioned against said side member, a triangular member hinged to said front wing member and positioned against it, a rear wing member hinged to said side member and positioned against it, a second triangular member hinged to said rear wing member and positioned against it, blinds hinged to said front wing and said rear wing members and positioned against them, blinds hinged to said left and right longitudinal strips and resting against said roof in one position of the device, and means for securing said side member to one of said side rails and means for securing said front wing member to said front rail and means for securing said rear wing member to said rear rail and means for securing said triangular members to said supports and screens hinged to said front and rear strips positioned to rest against said roof in one position of the device.

5. A sleeping compartment comprising a bottom, front and rear walls secured to said bottom, a wing compartment having a base provided with side rails, front and rear rails, the base being supported in part by said bottom, side pieces secured to said front and rear walls adapted to abut said side rails, a second wing compartment constructed and supported as said wing compartment first mentioned, a roof having front and rear strips in alignment with said front and rear walls, and left and right strips in alignment with said side rails, four supports collapsibly mounted between said bottom and said roof to position said roof in extended condition over said bottom in one position of said four supports and to position said front and rear strips against said front and rear walls of said roof in another position of said four supports, a partition pivotally secured to said left strip of said roof, a blind is pivotally mounted to said partition, a second partition pivotally secured to the right strip of said roof, a second blind is pivotally mounted to said second partition, said partitions being engageable with the respective side rails of said wing compartments, a front wing member pivotally secured to said front rail, a triangular member pivotally secured to said front wing member, a rear wing member pivotally secured to said rear rail, a second triangular member pivotally secured to said rear wing member, for each wing compartment respectively and means for detachably securing said front wing member and triangular member and said rear wing member and triangular member to the respective adjacent support and partition.

References Cited in the file of this patent

UNITED STATES PATENTS

| | | |
|---|---|---|
| 1,196,309 | Stein | Aug. 29, 1916 |
| 1,216,986 | Habig | Feb. 20, 1917 |
| 1,276,388 | Marx | Aug. 20, 1918 |
| 1,435,251 | Moore | Nov. 14, 1922 |
| 1,871,871 | Woods | Aug. 16, 1932 |
| 2,291,900 | Jimmes | Aug. 4, 1942 |
| 2,496,055 | King | Jan. 31, 1950 |

FOREIGN PATENTS

| | | |
|---|---|---|
| 152,611 | Great Britain | Dec. 23, 1920 |
| 344,982 | Italy | Dec. 5, 1936 |
| 448,048 | Great Britain | June 2, 1936 |